US011446990B2

(12) United States Patent
Bell et al.

(10) Patent No.: US 11,446,990 B2
(45) Date of Patent: Sep. 20, 2022

(54) ACCESSORY UTILITY VEHICLE DOOR PANEL

(71) Applicants: James Bell, Oklahoma City, OK (US); Jakob Andrew Bell, Oklahoma City, OK (US)

(72) Inventors: James Bell, Oklahoma City, OK (US); Jakob Andrew Bell, Oklahoma City, OK (US)

(*) Notice: Subject to any disclaimer, the term of this patent is extended or adjusted under 35 U.S.C. 154(b) by 0 days.

(21) Appl. No.: 15/999,892

(22) Filed: Aug. 28, 2018

(65) Prior Publication Data

US 2019/0248218 A1 Aug. 15, 2019

Related U.S. Application Data

(60) Provisional application No. 62/710,270, filed on Feb. 15, 2018.

(51) Int. Cl.
*B60J 5/04* (2006.01)
*B60J 5/06* (2006.01)

(52) U.S. Cl.
CPC ............ *B60J 5/0487* (2013.01); *B60J 5/067* (2013.01); *B60J 5/065* (2013.01)

(58) Field of Classification Search
CPC ............ B60J 5/0487; B60J 5/067; B60J 5/08
See application file for complete search history.

(56) References Cited

U.S. PATENT DOCUMENTS

| | | | |
|---|---|---|---|
| 2,460,399 A | 2/1949 | Schassberger | |
| 2,620,224 A | 12/1952 | Hedley | |
| 2,682,427 A | 6/1954 | Bright | |
| 3,055,700 A | 9/1962 | Glas | |
| 3,419,304 A * | 12/1968 | Sangimino | B62D 47/003 296/99.1 |
| 4,070,056 A | 1/1978 | Hickman | |
| 4,220,298 A | 9/1980 | Willis | |
| 4,644,699 A | 2/1987 | Chandler | |
| 6,773,054 B2 | 10/2004 | Martini | |
| 7,275,670 B1 | 10/2007 | Shumack | |
| 7,293,681 B2 | 11/2007 | Wills | |
| 7,686,379 B2 | 3/2010 | Lemieux | |
| 8,757,697 B2 * | 6/2014 | Held | B60R 5/047 296/83 |
| 8,794,692 B1 | 8/2014 | Burk | |
| 9,387,747 B2 | 7/2016 | Wang | |
| 9,527,371 B2 | 12/2016 | Flores | |
| 2002/0093224 A1 | 7/2002 | Richardson | |
| 2004/0061356 A1 * | 4/2004 | Martini | B60J 5/0487 296/153 |

(Continued)

*Primary Examiner* — Jason S Morrow
(74) *Attorney, Agent, or Firm* — Randal Homburg

(57) ABSTRACT

An accessory door panel for a utility vehicle provides a fabric door panel which can be quickly deployed and installed within a utility vehicle for emergency weather use where the utility vehicle has had the factory doors removed at the discretion of the driver. The fabric door panel is fitted to the contours of the door opening and may be stored from an overhead horizontal support member over the door or alternatively stored within a container mounted to the floor at the bottom of the door opening, the door being made of a flexible material that can be stretched across the door opening and anchored at several points along the door frame by independent anchors.

4 Claims, 5 Drawing Sheets

(56) References Cited

U.S. PATENT DOCUMENTS

| | | | |
|---|---|---|---|
| 2011/0260497 A1* | 10/2011 | Durm | B60J 1/2041 |
| | | | 296/152 |
| 2013/0062905 A1* | 3/2013 | Held | B60J 5/08 |
| | | | 296/141 |
| 2014/0265428 A1* | 9/2014 | Fennell | B60J 5/08 |
| | | | 296/143 |
| 2019/0299898 A1* | 10/2019 | Osorio | B60R 21/06 |

* cited by examiner

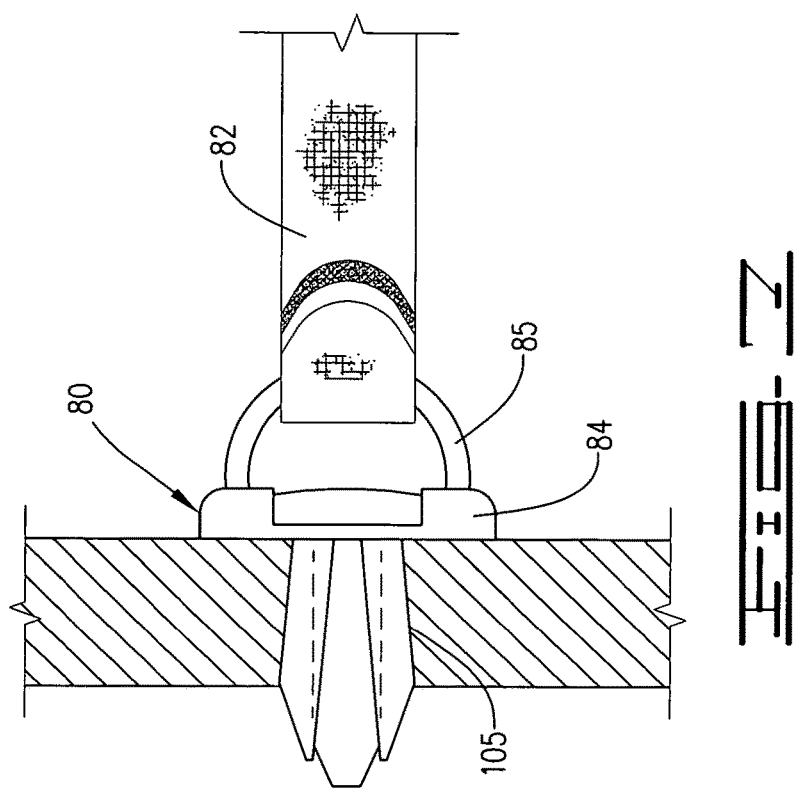
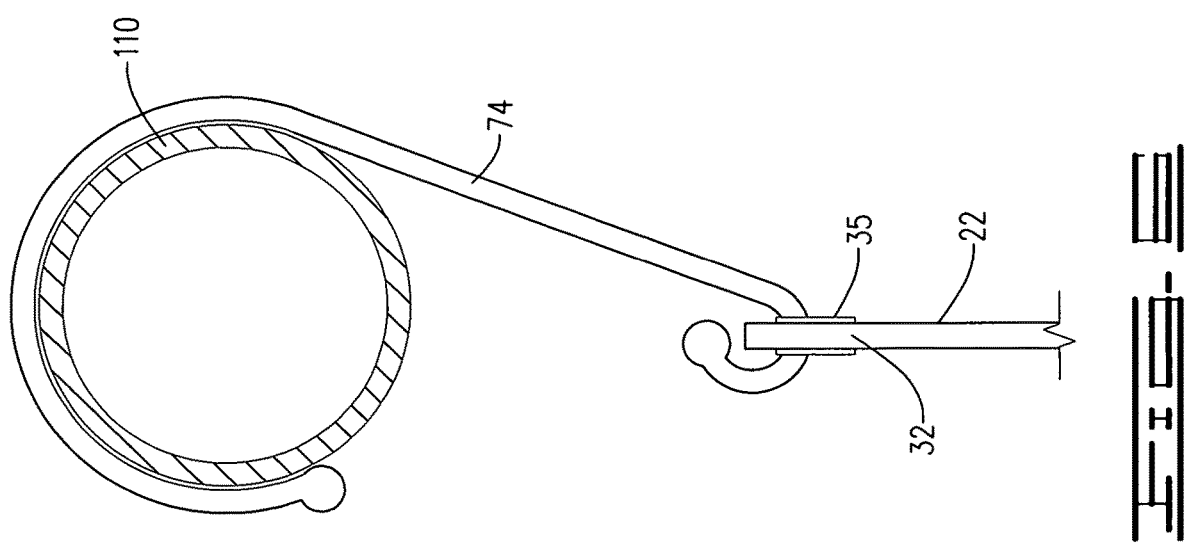

ACCESSORY UTILITY VEHICLE DOOR PANEL

CROSS REFERENCE TO RELATED APPLICATIONS

Applicant claims the benefit of Provisional patent Application No. 62/710,270, filed on Feb. 15, 2018, by the same inventors.

I. BACKGROUND OF INVENTION

1. Field of the Invention

An accessory door panel for a utility vehicle provides a fabric door panel which can be quickly deployed and installed within a utility vehicle for emergency weather use where the utility vehicle has had the factory doors removed at the discretion of the driver. The fabric door panel is fitted to the contours of the door opening and may be stored within a container mounted to the floor at the bottom of the door opening, below the door on a side panel or incorporated into a step bar below the door opening, the door panel being made of a flexible material that can be stretched across the door opening and anchored at several points along the door frame by independent anchors.

2. Description of Prior Art

A preliminary review of prior art patents was conducted by the applicant which reveal prior art patents in a similar field or having similar use. However, the prior art inventions do not disclose the same or similar elements as the present utility vehicle accessory door, nor do they present the material components in a manner contemplated or anticipated in the prior art.

This is evident in certain prior art wherein the factory hard panel doors are replaced by alternative door panels (U.S. Pat. No. 7,686,379 to Lemieux, U.S. Pat. No. 6,773,054 to Martini, U.S. Pat. No. 4,644,699 to Chandler, U.S. Pat. No. 4,220,298 to Willis, and U.S. Pat. No. 4,070,056 to Hickman), and recreational vehicles which provide for on-board storage systems for the door panels, as seen in U.S. Pat. No. 7,293,681 to Willis and U.S. Pat. No. 7,275,670 to Shumack.

A door flap is suspended from an upper roll bar support/cage, providing a "gull wing" which defines a frame, one or more panels, a latch and a lift-assist device such as a gas-strut, in U.S. Pat. No. 8,794,692 to Burke. A removable door skin for a vehicle mounting on a door frame member includes a flexible door panel that includes an edge and a flap, as well as a fastening means which provides a first part on the flexible door panel and a second part on the flap, shown as a hook and loop fastening material, as demonstrated in U.S. Pat. No. 7,686,379 to Lemieux.

An open mesh door panel comprising a rigid frame member has an open mesh panel over the frame member in U.S. Pat. No. 6,773,054 to Martini, while a transparent door panel is shown in U.S. Pat. No. 4,644,699 to Chandler, using space age plastic clear panels having high impact capacity for Jeeps an earth moving machines, providing full side vision. A fabric covered door frame over a resilient skeletal framework is shown in U.S. Pat. No. 4,070,056 to Hickman, the framework being bent to conform to the door opening. Other frame and fabric door panels are shown in earlier patent, U.S. Pat. No. 3,055,700 to Glas, U.S. Pat. No. 2,682,427 to Bright, and U.S. Pat. No. 2,620,224 to Hedley.

None of the above prior art patents demonstrate a frameless flexible door panel which is rolled and contained in a box attached below the door of a utility vehicle which is raised, unfurled and stretched across the door opening with a plurality of anchor points, as defined within the scope of the present accessory door panel.

II. SUMMARY OF THE INVENTION

Many owners of utility vehicles choose to remove the side door panels of the vehicle for recreational use. These factory doors are generally stored at the owner's home or sometimes stored within the vehicle. The removal of the factory door panels requires disengagement of the hinge element and can be time consuming. As an alternative, the present accessory door panel is a quick application panel made of a fabric material that can be placed in a readily available location on the vehicle and quickly applied to a door panel in the event a quick application is appropriate, including times of quick onset of excessive wind, rain, hail or storm.

The present accessory door panel is stored within a floor mounted container and extended upward to attach to the overhead horizontal frame member, each door panel held in place by a plurality of anchor members and attaching means to stretch the door panel across the door opening to enclose the door opening when the owner deems applicable.

III. DESCRIPTION OF THE DRAWINGS

The following drawings are formal drawings submitted with this utility patent application.

FIG. 6 is an embodiment of a hook or securing means engaging the upper margin of the door panel through a grommet included within a perimeter, the hook further attaching to the overhead support bar over the door opening, along section lines 6/6 of FIG. 2.

FIG. 7 is an embodiment of an anchoring means comprising an adjustable strap, an attachment pin and a side panel attaching means, utilized around the perimeter of the door panel to secure the door panel within the door frame of the utility vehicle.

IV. DESCRIPTION OF THE PREFERRED EMBODIMENT

Figure 1:
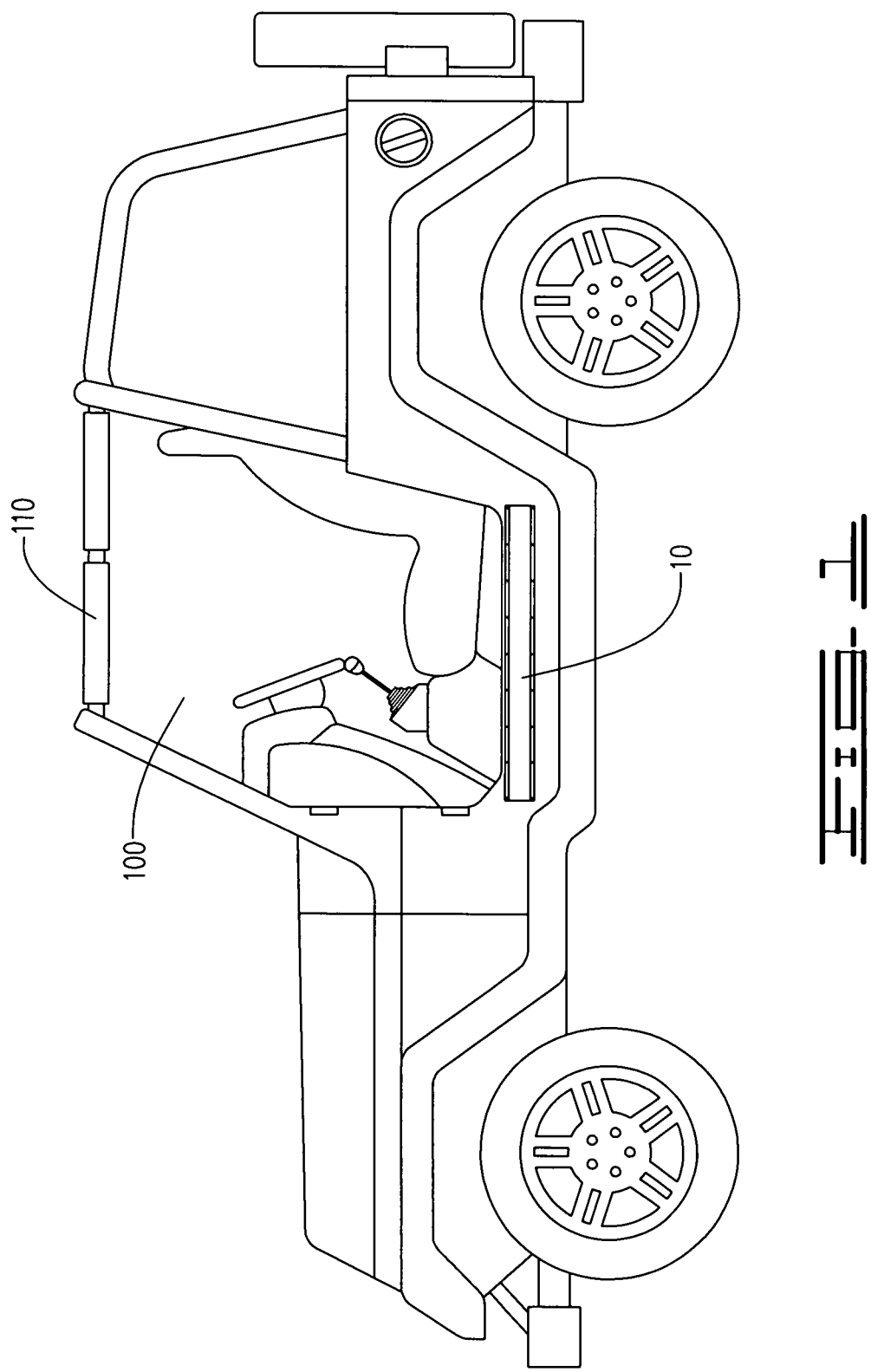
FIG. 1 is a view of the utility vehicle with the door panel in a retracted or stored position.

Many utility vehicles provide for removable doors on the driver and passenger sides of the vehicle, with some providing for both front and rear doors in the event the utility vehicle is a four seat vehicle. This provides for an "open cockpit" embodiment for recreational use. The present flexible door system 10 is provided in a compact stored and readily deployed door panel which is used in emergency or foul weather travel which comprises a flexible door panel 20 with a transparent window 30 which is installed in a retractable manner in a side mounted case 50 which provides the door panel in a coiled manner within the side mounted case 50 wherein an upper margin 22 of the flexible door panel 20 is lifted upward and applied to an overhead support member 110 over the respective door opening 100 while a lower margin 24 remains attached within the side mounted case 50. The flexible door panel 20 is retractably rolled up into a compact state, with a front side margin 26 and a rear side margin 28 later extended and stretched across the door opening 100 to be held in place across the door opening at multiple anchor points, as shown in FIGS. 1-6.

Each flexible door panel is a fabric material which has flexibility both horizontally and vertically and in a relaxed position would be smaller than the door opening 100, but still contoured to suitably fit the door opening 100 of the appropriate utility vehicle, with a driver side panel and a passenger side panel. Each flexible door panel 20 has the transparent window section 30, FIG. 1, to allow the driver to see through the flexible door panel 20, located similarly in size and position to that supplied by the factory door. A perimeter 32 of each flexible door panel 20 is heavily reinforced and preferably provided with either grommets 35 through which a securing means 70 is placed or directly attached to a plurality of anchoring means 80. The fabric comprising each flexible door panel 20 must be strong and durable and resistant to tearing or casual perforation. Fabric including DYNEEMA®, ballistic nylon, luggage grade nylon, canvas, rubberized fabric, military vinyl, coated mesh, neoprene or stretchable suede would be suited for the fabric components of each flexible door panel 20.

The disclosed embodiment provides the side mounted case 50 installing on or near the body panel below the door opening 100, FIG. 1. The flexible door panel 20 is retractably rolled up within the side mounted case 50, FIGS. 2-3, with the preferred embodiment having an upper rail 36 mounting to the upper margin 22 of the door panel 20. There may be a retractable recoil means 59 provided within the side mounted case 50 to aid in rolling up the flexible door panel for storage. The upper rail 36 would prevent the door panel 20 from completely being retracted within the side mounted case 50 during storage. The upper rail 36 is lifted from the side mounted case 50 and raised fully over the door opening 100. Upon full extension, the upper rail 36 or upper margin 22 is secured to the overhead support member 110 using the securing means 70 as represented by example in FIGS. 4-5, and installed around the front and rear side margins 26, 28, using the anchoring means 80 as represented by example in FIG. 6.

Figure 2:
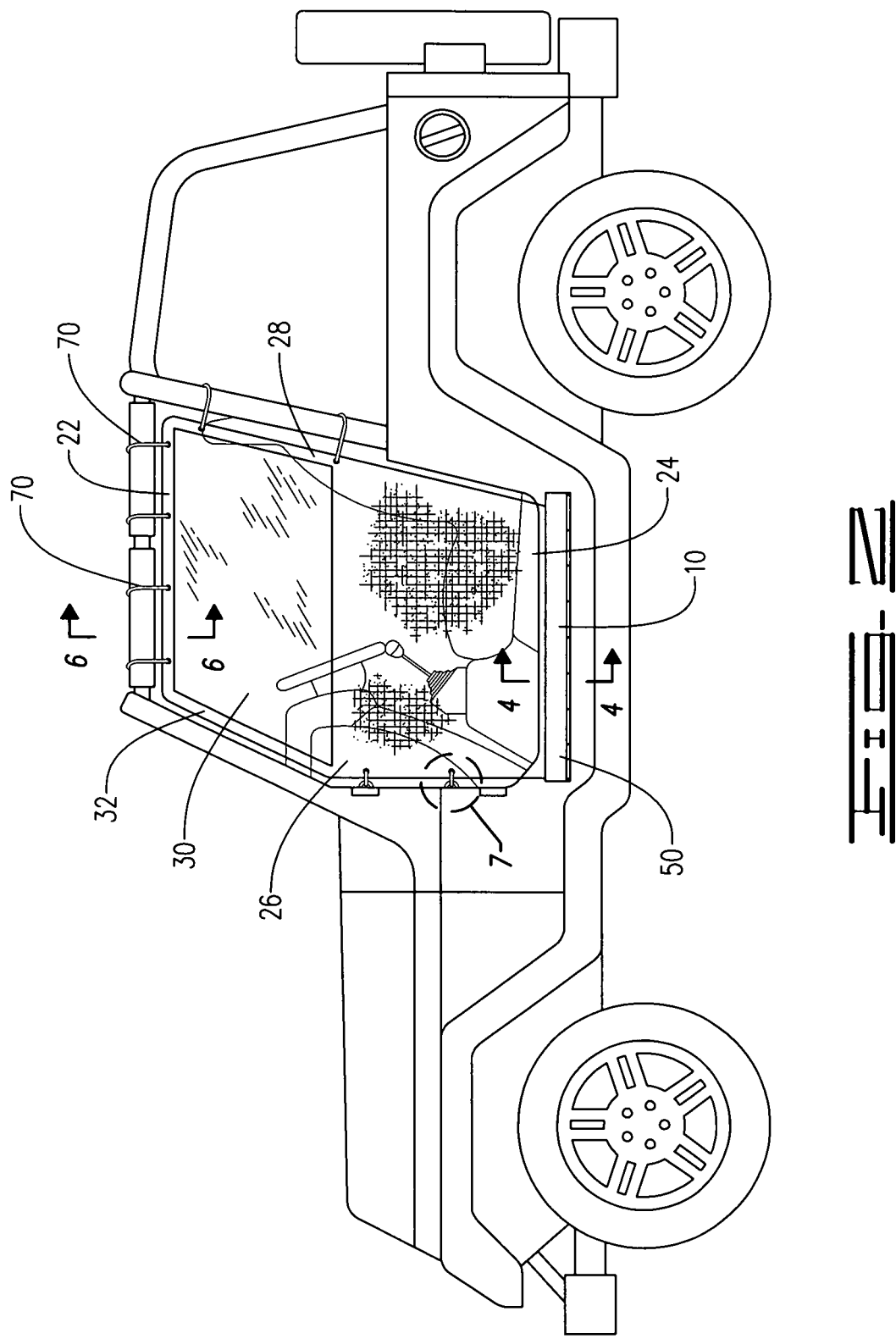
FIG. 2 is a view of the utility vehicle with the door panel in a deployed position.
Figure 3:
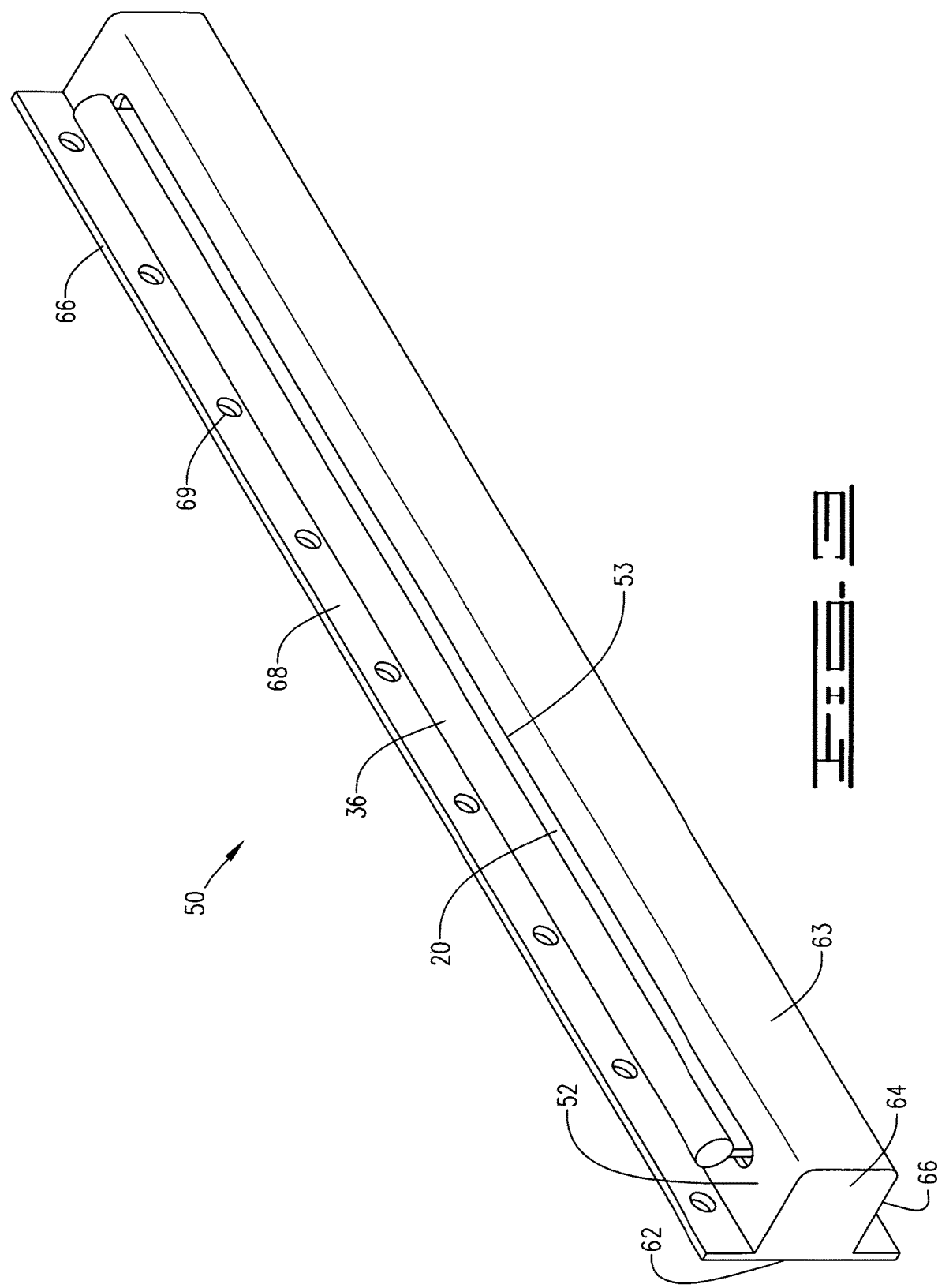
FIG. 3 is a top perspective view of the side mounted case with the retractable door panel partially extending from the slotted opening.

The side mounting case 50 further defines an enclosure with a top portion 52 forming the slotted opening 53, a front panel 63 and a rear panel 62, two end panels 64 and a bottom panel 66 extending at least one flange 68 providing a plurality of mounting bores 69 through which screws 70 are installed to mount the side mounting case 50 to the location on the utility vehicle chosen to mount, FIG. 2. FIG. 3 further defines an internal shaft 58 around which the door panel 50 is rolled and stored, the internal shaft 58 suspended between the two end panels 64 along a horizontal plane, the internal shaft 58 being compelled to rotate in a direction by the recoil means 59 causing a retraction of the door panel 20 into the side mounted case 50, as shown in FIG. 3. It would also be beneficial to prevent damage to the door panel 20 that the slotted opening 53 define a rounded margin 54 along a contact edge 56 to avoid and minimize friction or damage to the door panel 20 as it is rolled in an out of the side mounted case. Additional attaching means be installed or provided along a lower edge of the utility vehicle door opening to supplementally secure a lower portion of the door panel to the utility vehicle above the enclosure, not shown.

The side mounted case 50 may be presented in alternative embodiments, including the side mounted case as shown in FIG. 2. The side mounted case 50 may be installed in the lower portion of the door opening itself and held in place as during the time the factory door is removed, the case being a door trough shape which would not interfere with entry or exit from the vehicle. The side mounted case may also be included as part of a step-up or side rail that installs on the utility vehicle, with the door panel being withdrawn and retracted through an area of the step-up or side rail to prevent damage to the door panel and its upper rail and hardware, if any.

Figure 5:
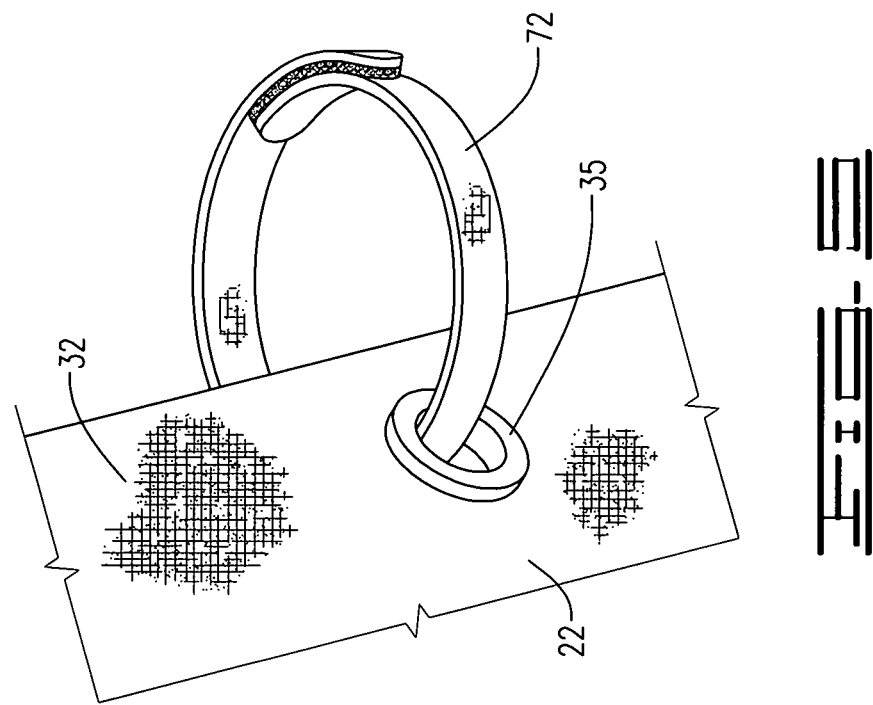
FIG. 5 is an embodiment of a securing means in the form of a hook and loop fabric strap attaching the upper margin of the door panel through a grommet and around the overhead support member.
Figure 4:
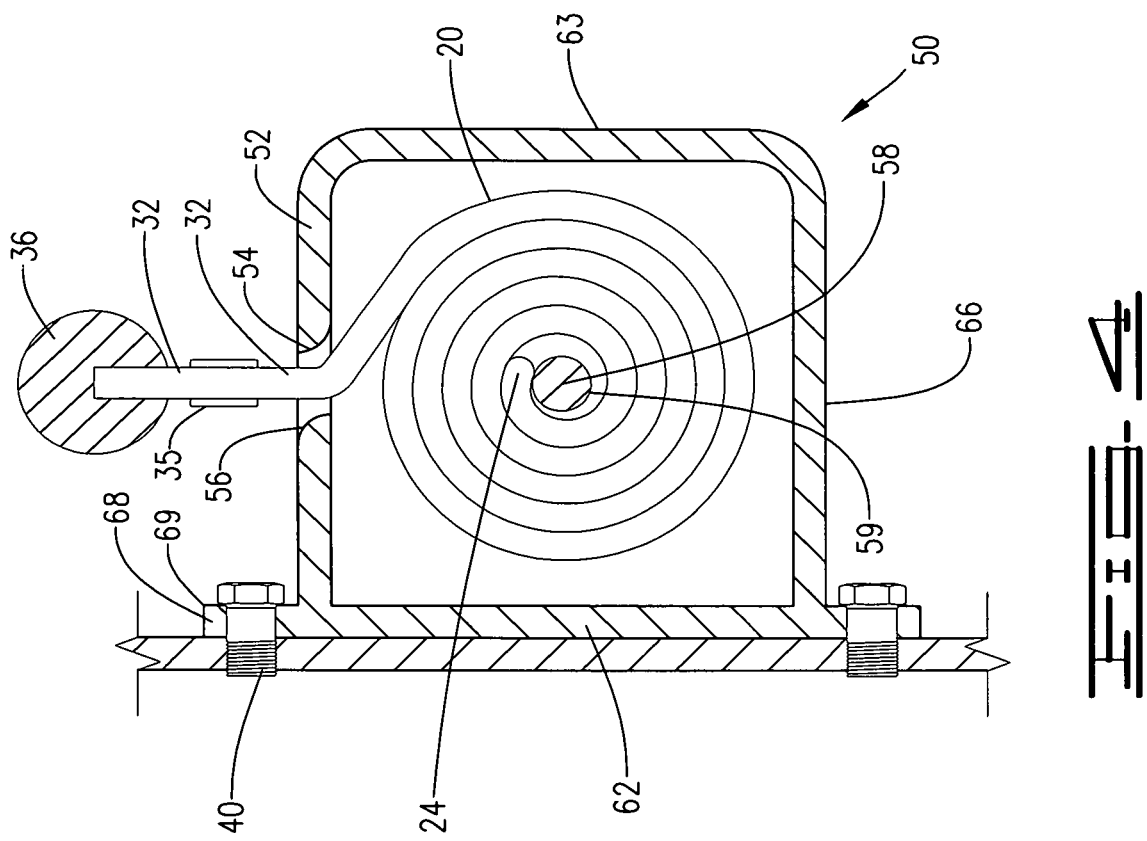
FIG. 4 is a cross sectional view of the flexible door system showing the door panel in a coiled position with the upper rail extending above the slotted opening, along section lines 4/4 of FIG. 2.

The included components for securing the door panel 20 to the overhead support member 110 may include hook and look fabric band 72 through grommets 35 located along the upper margin 22 of the door panel, FIG. 4, with or without hooks 74, FIG. 5. The front and rear side margins 26, 28, of the door panel 20 may include adjustable straps 82 and/or hooks, as shown in FIG. 6, which are sewn onto the door panel or placed through additional perimeter grommets, with side panel attaching means 85, FIG. 6, providing attachment pin 84 locations for the hooks or straps 82 to secure the door panels to the side margins of the door opening 100. These attachment pins 84 may temporarily install within drilled holes 105 in the door opening sheet metal, FIG. 6, with a temporary connecting means, which could be removed and installed at will, depending upon whether the owner elects to utilize the factor door panels or use the flexible door panels 20. These attachment pins 84 might resemble automobile body pin connecting element similar in operation as known in the prior art.

Many complementary features may be added to each door panel including pockets, aerodynamic enhancements, logos, artwork, or personalized and custom features as determined by the vehicle owner. Each door panel may include zip out panels which would allow entry and egress through the door without having to retract the door or remove it from its attachment. It may also be adapted to four door models, with two independent door panels per side extending from a singular side mounted case. The fabrics in the door panel require a certain degree of stretch in both vertical and horizontal directions to cover as much of the door opening as possible without a necessary seal, but with adequate coverage to prevent or significantly reduce wind and weather elements from entering the vehicle during travel, with each door panel being quickly deployed and secured after initial installation. The window section 30 is likely inflexible, as most clear and deformable plastics and vinyl do not stretch.

The other advantage is the flexible door panels store in a compact manner in locations which are readily accessible and do not interfere with operation of the utility vehicle, nor do they significantly obstruct the door opening 100 within which they are located when stored. Although the embodiments of the flexible door system 10 have been described and shown above, it will be appreciated by those skilled in the art that numerous modifications may be made therein without departing from the scope of the invention as herein described.

We claim:

1. A flexible door system conforming to a door opening of a utility vehicle which has had its door removed, the flexible door system comprising:

a flexible door panel defining an upper margin, a lower margin, a front side margin, a rear side margin, an outer perimeter and a transparent window;

a side mounted case defining a top section having a slotted opening, a rear section, a front section, two end sections, and a base defining at least one flange having two or more bores, each of said two or more bores receiving a respective screw attaching said side mounted case to the side of said utility vehicle below or within said door opening;

an internal shaft suspended between said two end sections, said internal shaft affixed to said lower margin of said flexible door panel, said internal shaft including a recoil means which retracts said flexible door panel within said side mounted case through said slotted opening;

one or more securing means attaching said upper margin of said flexible door panel to an overhead support member of said utility vehicle; and one or more anchors to secure said front side margin and said rear side margin within said door opening to side panel attaching means installed within said door opening of said utility vehicle, wherein said flexible door is extended from said side mounted case and attached within said door opening for use and said flexible door panel is folded and retracted within said side mounted case when not in use.

2. The flexible door system of claim 1, further comprising:

said upper margin, front side margin and rear side margin of said flexible door panel define a perimeter within which a plurality of spaced grommets are installed;

said upper margin of said flexible door panel is secured to said overhead support member of said utility vehicle by a hook and loop fabric strap passed through said grommets along said perimeter of said upper margin of said door panel; and said front side margin and said rear side margin are attached to said door opening by said side panel attaching means connecting to said one or more anchors defining an attachment pin installed within a hole in said door opening.

3. The flexible door system of claim 1, further comprising:

said upper margin, front side margin and rear side margin of said flexible door panel define a perimeter within which a plurality of grommets are installed;

said upper margin of said flexible door panel is secured to said overhead support member of said utility vehicle by a hook passed through said grommets along said perimeter of said upper margin of said door panel and over said overhead support member; and said front side margin and said rear side margin are attached to said door opening by said side panel attaching means connecting to said one or more anchors defining an attachment pin installed within a hole in said door opening.

4. The flexible door system of claim 1, further comprising:

said slotted opening of said top section defining a rounded margin on a contact edge to prevent damage and reduce friction to said flexible door panel as it is withdrawn and retracted within said side mounted case; and said upper margin of said flexible door panel defines an upper rail which is larger than said slotted opening of said side mounted case to prevent complete retraction of said flexible door panel within said side mounted case, said upper rail further integrating said securing means attaching said upper margin of said flexible door panel to said overhead support member of said utility vehicle.

* * * * *